(12) United States Patent
Hsieh et al.

(10) Patent No.: US 8,351,951 B2
(45) Date of Patent: Jan. 8, 2013

(54) METHOD OF CONTROLLING CHANNEL ACCESS AND RELATED MOBILE DEVICE

(75) Inventors: Jung-Ta Hsieh, Taoyuan County (TW); Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 211 days.

(21) Appl. No.: 12/716,286

(22) Filed: Mar. 3, 2010

(65) Prior Publication Data

US 2010/0248731 A1 Sep. 30, 2010

Related U.S. Application Data

(60) Provisional application No. 61/163,036, filed on Mar. 24, 2009.

(51) Int. Cl.
*H04W 72/00* (2009.01)

(52) U.S. Cl. ............ 455/450; 455/404.1; 455/451; 455/452.1; 370/462

(58) Field of Classification Search .......... 455/450–455, 455/423–425, 434, 464, 404.1, 509–516, 455/521, 560, 561, 418–422.1, 524, 525, 455/549, 62, 67.11; 370/247, 251, 264, 322, 370/329, 332, 333, 341, 348, 433, 437, 447, 370/448, 461, 462, 310.2, 328, 338, 343; 709/228, 229

See application file for complete search history.

(56) References Cited

U.S. PATENT DOCUMENTS

| | | | | |
|---|---|---|---|---|
| 6,771,632 B2 * | 8/2004 | Dick et al. | ............ | 370/342 |
| 7,061,890 B2 * | 6/2006 | Kim et al. | ............ | 370/335 |
| 7,733,896 B2 * | 6/2010 | Chuah et al. | ............ | 370/444 |
| 2004/0032877 A1 | 2/2004 | Chuah | | |
| 2007/0064665 A1 * | 3/2007 | Zhang et al. | ............ | 370/343 |
| 2008/0159160 A1 * | 7/2008 | Das et al. | ............ | 370/252 |
| 2008/0205433 A1 * | 8/2008 | Pihlaja et al. | ............ | 370/461 |
| 2008/0253323 A1 * | 10/2008 | Fischer | ............ | 370/329 |
| 2008/0298325 A1 * | 12/2008 | Vujcic | ............ | 370/336 |
| 2010/0226248 A1 * | 9/2010 | Grilli | ............ | 370/230 |

FOREIGN PATENT DOCUMENTS

| | | |
|---|---|---|
| TW | 201116129 | 5/2011 |
| WO | 2007052900 A1 | 5/2007 |
| WO | 2010102082 A1 | 9/2010 |

OTHER PUBLICATIONS

3rd Generation Partnership Project; Technical Specification Group Radio Access Network; Radio Resource Control (RRC) Protocol Specification (Release 8), 3GPP TS 25.331 V8.6.0 (Mar. 2009), front page+ pp. 2-1673, XP050368026, Sophia Antipolis, France.

Office action mailed on Oct. 17, 2012 for the Taiwan application No. 099108709, filing date Mar. 24, 2010, p. 1-5.

* cited by examiner

*Primary Examiner* — Jinsong Hu
*Assistant Examiner* — San Htun
(74) *Attorney, Agent, or Firm* — Winston Hsu; Scott Margo

(57) ABSTRACT

A method of controlling channel access for a mobile device in a wireless communication system includes receiving a dynamic persistence level from a base station, determining a persistence value according to the dynamic persistence level and at least a one persistence coefficient stored in the mobile device, comparing the persistence value with a random number of the mobile device, and determining whether access to a channel is permitted to be accessed for sending a message from the mobile device to the base station according to a comparison result of the persistence value and with the random number.

16 Claims, 10 Drawing Sheets

| N | P(N) | P0 (A₀=0.5, A₁=0.5) | P0 (A₀=0.9, A₁=0.1) | P0 (A₀=0.99, A₁=0.01) | P0 (A₀=0.75, A₁=0.5) |
|---|---|---|---|---|---|
| 1 | 1 | 1 | 1 | 1 | 1.25 |
| 2 | 0.5 | 0.75 | 0.95 | 0.995 | 1 |
| 3 | 0.25 | 0.625 | 0.925 | 0.9925 | 0.875 |
| 4 | 0.125 | 0.5625 | 0.9125 | 0.99125 | 0.8125 |
| 5 | 0.0625 | 0.53125 | 0.90625 | 0.990625 | 0.78125 |
| 6 | 0.03125 | 0.515625 | 0.903125 | 0.990313 | 0.765625 |
| 7 | 0.015625 | 0.507813 | 0.901563 | 0.990156 | 0.757813 |
| 8 | 0.0078125 | 0.503906 | 0.900781 | 0.990078 | 0.753906 |

FIG. 6

| P0V ($A_0=0.5, A_1=0.5$) | P0V ($A_0=0.9, A_1=0.1$) | P0V ($A_0=0.99, A_1=0.01$) |
|---|---|---|
| WiMax | LTE | GSM |

FIG. 9

METHOD OF CONTROLLING CHANNEL ACCESS AND RELATED MOBILE DEVICE

CROSS REFERENCE TO RELATED APPLICATIONS

This application claims the benefit of U.S. Provisional Application No. 61/163,036, filed on Mar. 24, 2009 and entitled "Method for controlling channel access" the contents of which are incorporated herein.

BACKGROUND OF THE INVENTION

1. Field of the Invention

The present invention relates to a method used in a wireless communication system and related mobile device, and more particularly, to a method of controlling channel access for a mobile device in a wireless communication system and related mobile device using the method.

2. Description of the Prior Art

Cellular networks provide the infrastructure to support mobile phone devices. The network is organized in a series of cells to provide coverage to different areas. At the centre of each cell is a base station, which provides connections from the mobile devices back into the fixed telecommunications backhaul network to route traffic to its end destination.

The base station is unaware of a mobile device within its cell coverage until the mobile device makes contact with the base station. In a UMTS (Universal Mobile Telecommunications System) system, the mobile device, also known as user equipment (UE), makes initial contact with the base station over a channel called a Random Access Channel (RACH). However, the mobile device first needs to know the characteristics of the RACH for the cell that it is currently operating in. RACH characteristics, amongst other system information, are provided by the base station via a Broadcast Channel (BCH) which is transmitted to all mobile devices across the cell.

In addition, the UE can access the base station via more than one random access channels. By random access, there can be a number of UEs attempting to make simultaneous access attempts using the channel. A consequence of these simultaneous access attempts is collision, resulting in a reduction in the capacity of the channels. In order to reduce the collision, UMTS uses Access Service Classes (ASC) shown below to define how and how often a specific UE can use these RACHs.

| | | | | ASC # i | | | |
|---|---|---|---|---|---|---|---|
| 0 | 1 | 2 | 3 | 4 | 5 | 6 | 7 |
| $P_i$ | 1 | P(N) | $s_2$ * P(N) | $s_3$ * P(N) | $s_4$ * P(N) | $s_5$ * P(N) | $s_6$ * P(N) | $s_7$ * P(N) |

, where $P(N) = 2^{-(N-1)}$.

ASC is defined by an identifier i that defines a certain partition of the PRACH resources and may be numbered in the range $0 \leq i \leq \text{NumASC} \leq 7$ (i.e. the maximum number of ASCs is 8). In addition, ASC is associated with persistence value Pi. The persistence values Pi to be associated with each ASC shall be derived from the dynamic persistence level $N=1, \ldots, 8$ and the persistence scaling factors si is broadcasted from base stations of UMTS system.

ASC#0 is assigned the highest priority and ASC#7 is assigned the lowest priority. ASC#0 shall be used to make emergency calls which has got more priority and more PRACH resources. The persistence value for P0 is always set to 1 and is associated with ASC#0. The persistence values for others are calculated from broadcasted signaling. These persistence values controls the RACH transmissions.

However, if a large number of mobile devices with ASC#0 setting the persistence value to 1 continuously try to make contact with the base station, e.g. make emergency calls, via the RACH, the RACH can become overloaded to the extent that messages cannot get through to the base station. This causes low probability of successful RACH transmission for a mobile device.

SUMMARY OF THE INVENTION

Therefore, the present disclosure aims to provide a method and related mobile device for controlling channel access to improve a transmission success rate, and moreover also to achieve fast transmission and multi-system support.

According to an aspect of the present disclosure, a method of controlling channel access for a mobile device in a wireless communication system includes receiving a dynamic persistence level from a base station, determining a persistence value according to the dynamic persistence level and at least one persistence coefficient stored in the mobile device, comparing the persistence value with a random number; and according to a comparison result of the persistence value with the random number, determining whether a channel is permitted to be accessed for sending a message from the mobile device to the base station.

According to another aspect of the present disclosure, a mobile device of a wireless communication system is used for appropriately controlling channel access to avoid channel overload and includes a storage unit and a processor. The storage unit is used for storing at least a persistence coefficient and program code corresponding to a process. The processor is coupled to the storage unit and used for processing the program code to execute the process. The process includes receiving a dynamic persistence level from a base station of the wireless communication system, determining a persistence value according to the dynamic persistence level and at least one persistence coefficient stored in the mobile device, comparing the persistence value with a random number of the mobile device, and determining whether a channel is permitted to be accessed for sending a message from the mobile device to the base station according to a comparison result of the persistence value with the random number.

According to another aspect of the present disclosure, a mobile device of a wireless communication system for appropriately controlling channel access to avoid channel overload and includes a wireless unit, a storage unit, a first value determining unit, a comparing unit and an access determining unit. The wireless unit is used for receiving a dynamic persistence level from a base station of the wireless communication system. The storage unit is used for storing at least one persistence coefficient. The first value determining unit is used for determining a persistence value according to the dynamic persistence level and the persistence coefficient (s). The comparing unit is used for comparing the persistence value with a random number of the mobile device. The access determining unit is used for, according to a comparison result of the persistence value with the random number, determining whether a channel is permitted to be accessed for sending a message from the mobile device to the base station.

These and other objectives of the present disclosure will no doubt become obvious to those of ordinary skill in the art after

BRIEF DESCRIPTION OF THE DRAWINGS

FIG. 6 is a persistence value scheme according to an example of the present disclosure.

FIG. 9 is an example of multiple sets of persistence coefficients.

DETAILED DESCRIPTION

Figure 1:
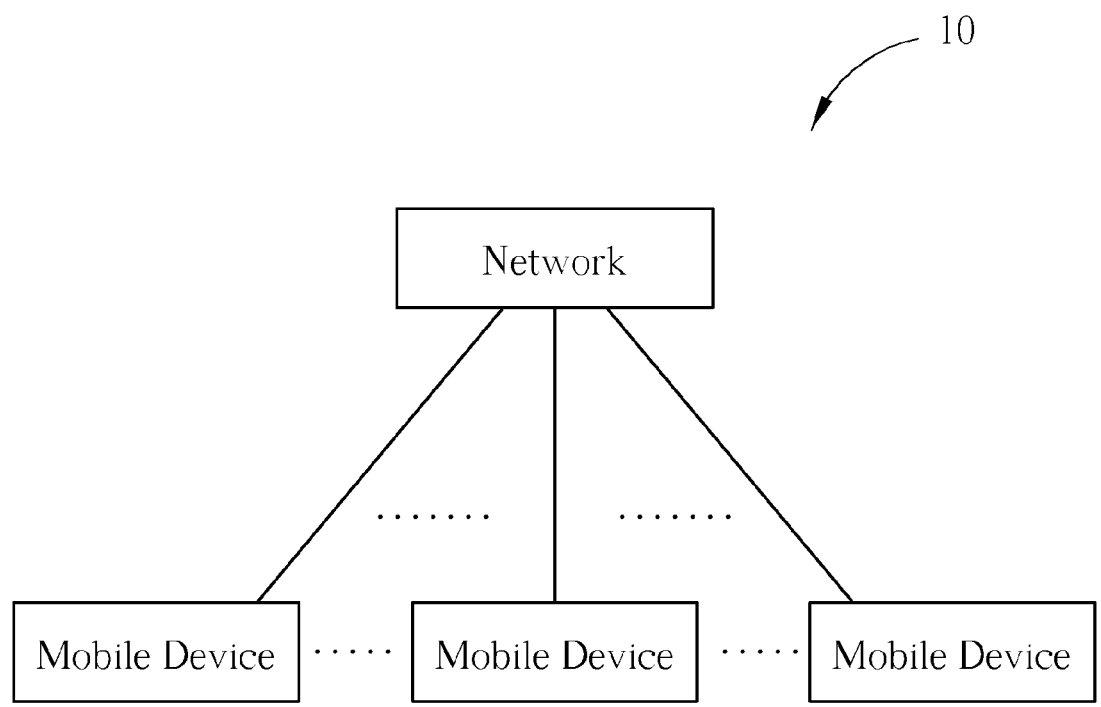
FIG. 1 is a schematic diagram of a wireless communication system.

Please refer to FIG. 1, which illustrates a schematic diagram of a wireless communication system 10. The wireless communication system 10 can be an UMTS (Universal Mobile Telecommunications System) system or other mobile communication system, and is briefly composed of a network and a plurality of mobile devices. Practically, a UTRAN (UMTS Terrestrial radio access network), part of the network, comprises a plurality of Node-Bs (known as base stations). One or more Node-Bs can serve a cell covering a limited land area to provide radio coverage. The mobile devices are also referred by user equipments (UEs) and can be devices such as a mobile phone, a personal digital assistant (PDA), a laptop computer or any other devices with a processor, capable of wireless communications. Besides, two different communications links are defined between the network and the UE. One communications link is a downlink where the network and the UE act as a transmitter and a receiver respectively. The other communications link is an uplink where the UE and the network act as a transmitter and a receiver respectively.

In UMTS system, the mobile device can be served by a cell with a variety of services which are divided into different priority groupings by ASCs (Access Service Classes). Before being served with the services, the mobile device has to perform a random procedure for initial access to the cell and thereby needs to access a random access channel (RACH) with a transmission control procedure. Depended on the ASC of the mobile device, related transmission control procedures are different. Each mobile device includes at least a persistence coefficient used for the ASC associated with the highest prioritized service (e.g. an emergency call service). The persistence coefficient(s) can be set during manufacture or be stored in subscriber identity module (SIM), given by a service provider. The manufacturer can arrange distribution of the persistence coefficient values for all the mobile devices beforehand, depended on the number and type of the supported systems.

To perform any of the transmission control procedures, the mobile device requires a dynamic persistence level that is calculated by the network based on analysis of channel access requests from the served mobile devices. To perform the transmission control procedure associated with some of the ASCs, other than the ASC of the highest prioritized service, the mobile device further requires scaling factors obtained from the network. Detailed operation of transmission timing determinations are described later.

Figure 2:
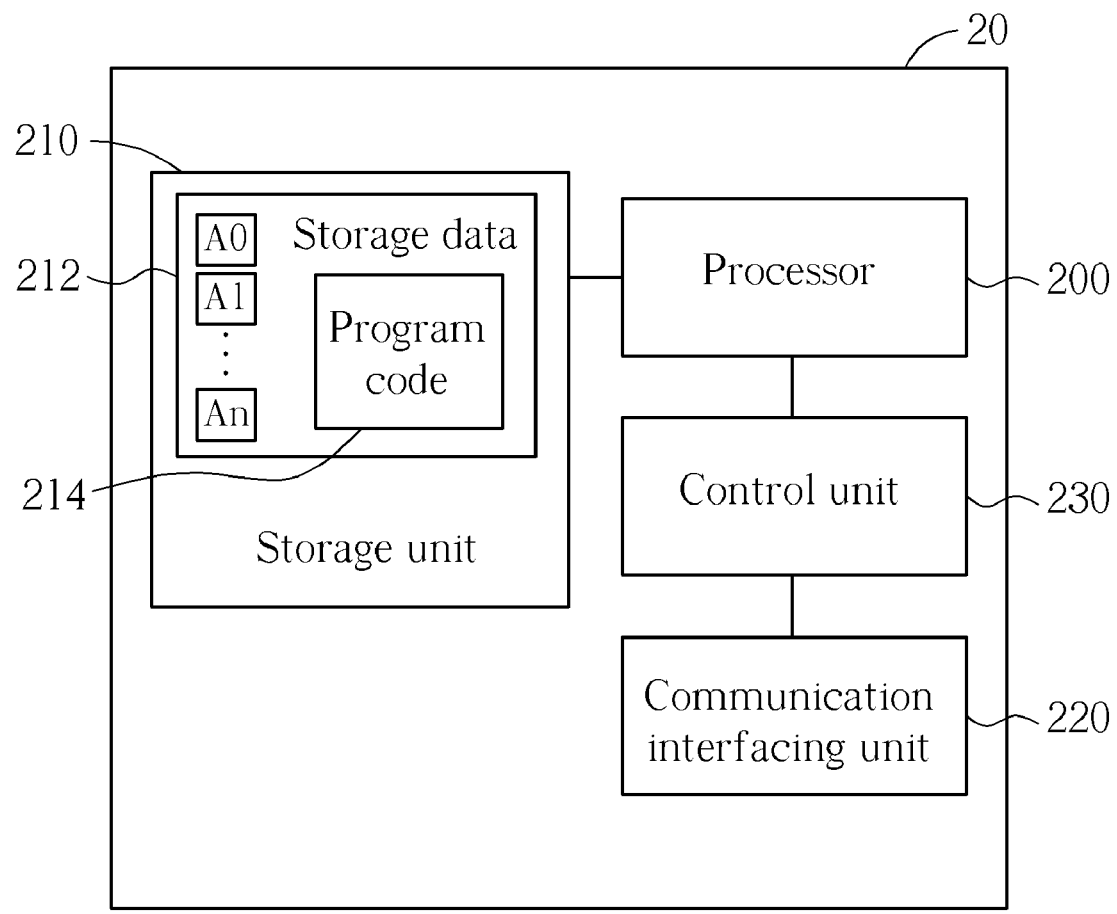
FIG. 2 is a schematic diagram of a mobile device according to an example of the present disclosure.

Please refer to FIG. 2, which illustrates a schematic diagram of a mobile device 20 according to an example of the present disclosure. The mobile device 20 can be the UE (mobile device) shown in FIG. 1 and includes a processor 200, a storage unit 210, a communication interfacing unit 220 and a control unit 230. The storage unit 210 is any data storage device that stores storage data 212 thereafter read and processed by the processor 200. Examples of the storage unit 210 include a SIM card, non-volatile memory (NVM), random-access memory (RAM), CD-ROMs, magnetic tapes, hard disks, and optical data storage devices. The control unit 230 controls the communication interfacing unit 220 and related operations and states of the mobile device 20 according to processing results of the processor 200. The communication interfacing unit 220 is preferably a radio transceiver for wirelessly communicating with other communication devices, such as a base station. The storage data 212 includes persistence coefficients A0-An corresponding to a ASC of the highest prioritized service and program code 214 corresponding to a process for controlling the RACH based on the ASC of the mobile device 20. The persistence coefficients A0-An can be set by the manufacturer if being stored in the NVM, such as ROM (Read only memory). Or, the persistence coefficients A0-An can be set by the service provider if being stored in the SIM card.

Figure 3:
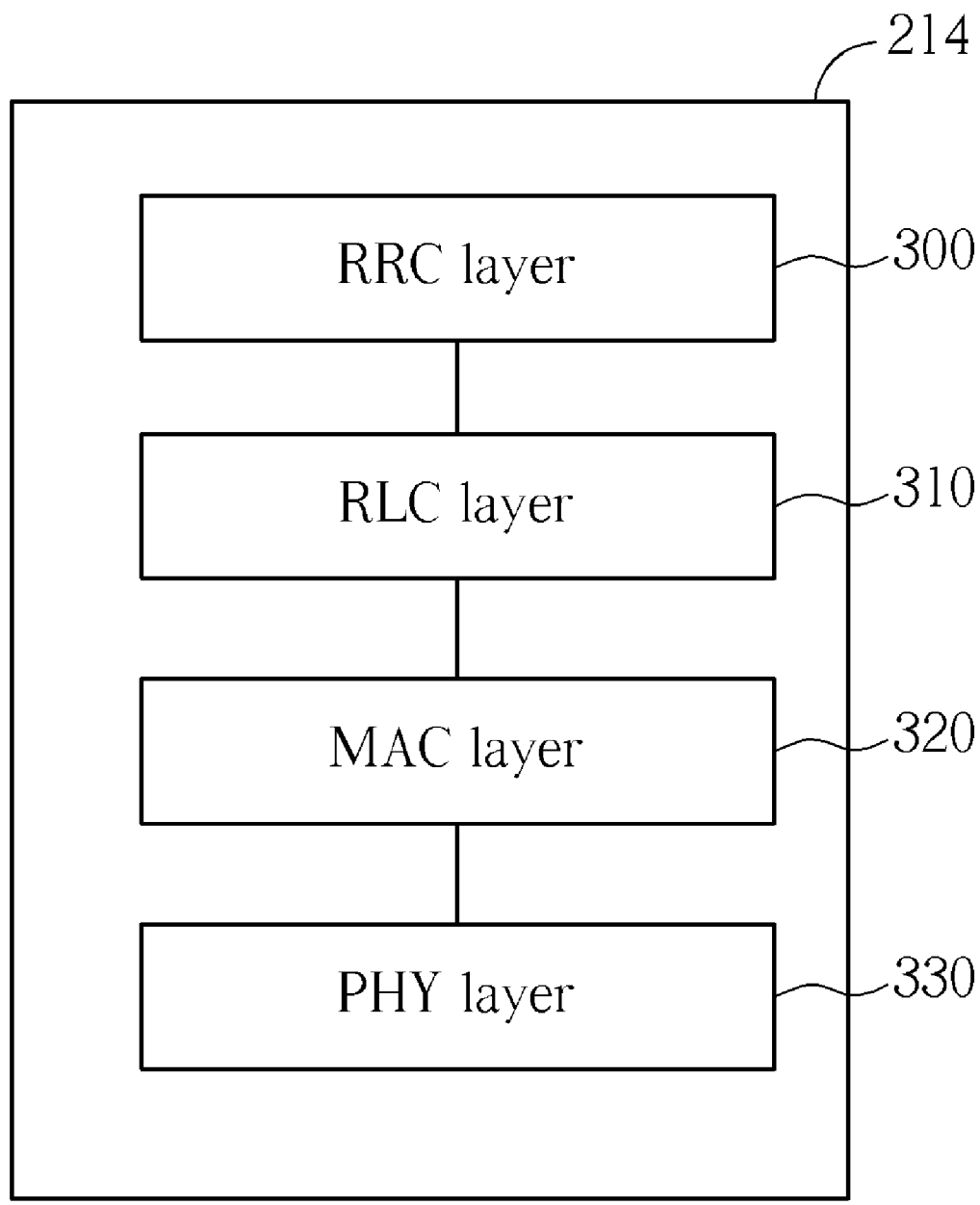
FIG. 3 is a schematic diagram of the program code applied to the UMTS system according to FIG. 2.

Please refer to FIG. 3, which illustrates a schematic diagram of the program code 214 applied to the UMTS system. The program code 214 includes program code of multiple communication protocol layers, which from top to bottom are a radio resource control (RRC) layer 300, a radio link control (RLC) layer 310, a medium access control (MAC) layer 320 and a physical (PHY) layer 330.

The RRC layer 300 can retrieve information allocated to related ASCs from system information blocks (SIBS) broadcasted by the base station. Taking the UMTS system for example, the RRC layer 300 can retrieve the dynamic persistence level from a SIB type 7 and the persistence scaling factors from a SIB type 5 or type 5b is and possibly also from a SIB type 6. Furthermore, the RRC layer 300 can also receive resource information associated with the PHY layer 330 from the network.

The MAC layer 320 plays a main role in performing the abovementioned transmission control procedures, for determining whether or not to transmit a RACH message (i.e. to access the RACH) when a link to the network is required. When the RACH message is determined to be transmitted, the MAC layer 320 sends requests to the PHY layer 330. When the mobile device 20 is configured to access the RACH with the ASC of the highest prioritized service, the MAC layer 320 performs a transmission control procedure based on the dynamic persistence level and the stored persistence coefficients A0-An. For channel access with other ASCs, the MAC layer 320 performs a transmission control procedure based on the dynamic persistence level and the persistence scaling factors obtained from the network.

The PHY layer 330 controls transmission and reception of signals over the air interface. With respect to the access to the RACH, the PHY layer 330 can transmit the RACH messages on a PRACH (Physical Random Access Channel) according to a slotted ALOHA scheme when being requested by the MAC layer 320.

The slotted ALOHA scheme is an OSI (Open System Interconnection) layer 2 protocol scheme where the mobile device can attempt to perform RACH transmission at one of predetermined time intervals or access slots. Groups of these access slots, called sub-channels, can be assigned so that only a particular ASC can use this group of access slots. For example, all traffic to emergency services is set to high priority and thereby a high number of sub-channels are assigned so that the PHY layer 330 has a high number of access slots to choose and is more likely to be able to access the RACH. Information on the number of sub-channels allocated to each ASC is passed to the PHY layer 330 from the RRC layer 300.

The PHY layer 330 does not attempt to perform a PRACH transmission for the RACH message until requests from the MAC layer are received. In this way if the RACH transmission is unsuccessful and is negatively acknowledged by the base station, the PHY layer 330 does not retransmit the RACH message until requests for retransmission are received from the MAC layer 320. That is, the MAC layer 320 controls a random back-off time in the slotted ALOHA scheme. The random back-off time is also controlled by the transmission control procedure. If the channel access remains not permitted for many times of the transmission control procedure, the random back-off time is longer, else the random back-off time is shorter.

Figure 4:
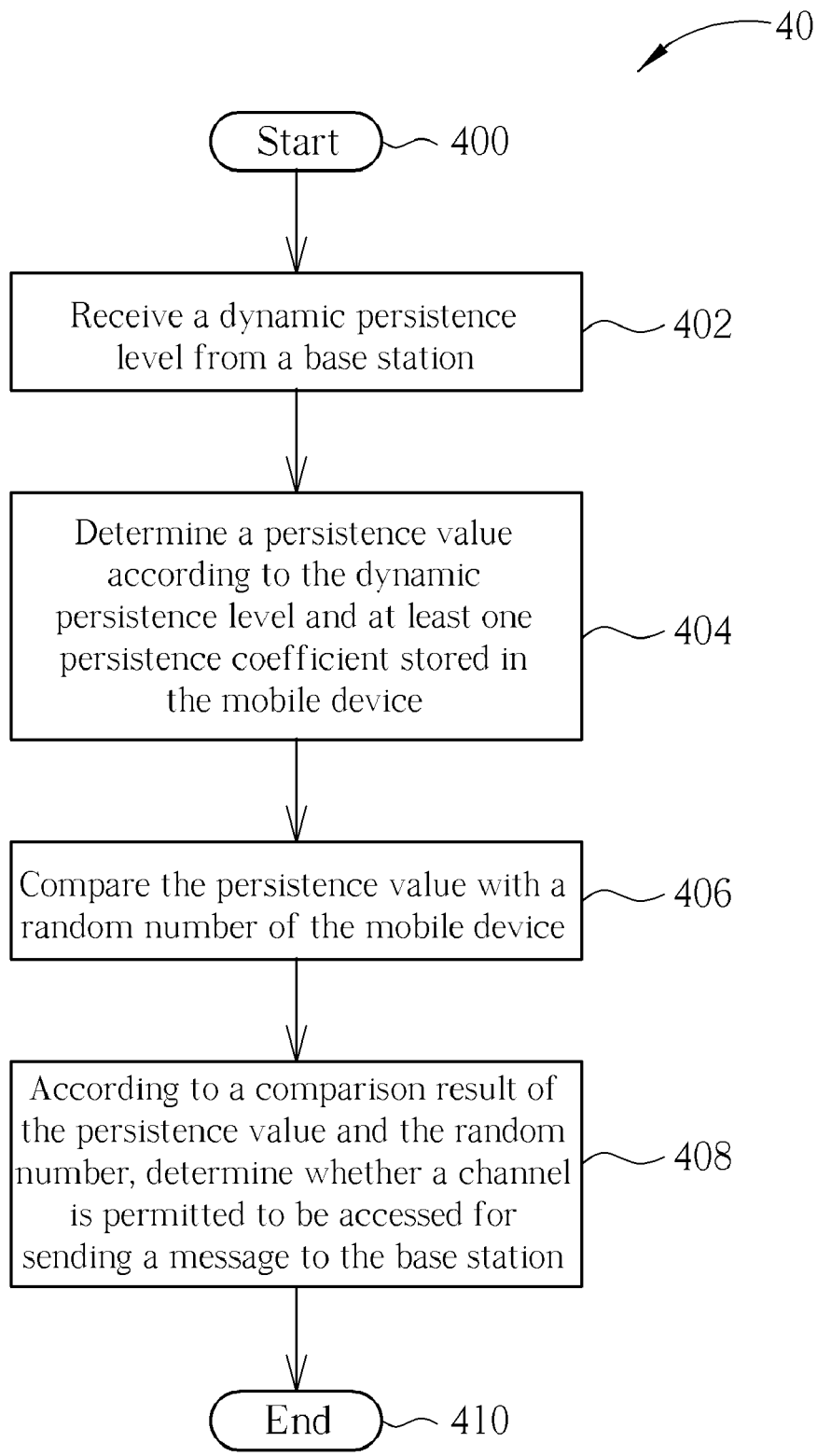
FIG. 4 is a flowchart of a transmission control procedure according to an example of the present disclosure.

Please refer to FIG. 4, which illustrates a flowchart of a transmission control procedure 40 according to an example of the present disclosure. The transmission control procedure 40 is utilized for controlling channel access associated with the highest prioritized service for a mobile device of a wireless communication system and can be compiled into the program code 214 of the storage data 212. The transmission control procedure 40 includes the following steps:

Step 400: Start.

Step 402: Receive a dynamic persistence level from a base station.

Step 404: Determine a persistence value according to the dynamic persistence level and at least one persistence coefficient stored in the mobile device.

Step 406: Compare the persistence value with a random number of the mobile device.

Step 408: According to a comparison result of the persistence value and the random number, determine whether a channel is permitted to be accessed for sending a message to the base station.

Step 410: End.

According to the transmission control procedure 40, before any transmission on the channel, the mobile device receives the dynamic persistence level from the base station and has to determine whether the channel is permitted to be accessed or not. When the channel access is permitted, the mobile device sends the message to the base station, and the message may be applied for the highest prioritized service, such as the emergency call service. The persistence value is determined according to the dynamic persistence level and at least one persistence coefficient stored in the mobile device. For example, $PV=A0+A1*P(N)+\ldots+An*P(N)$, where PV is the persistence value, A0-An are the persistence coefficients, and P(N) is a function of a dynamic persistence level N. The determined persistence value is then compared with the random number that can be generated by the mobile device. According to the comparison result, the mobile device determines whether the channel access is permitted or not. For example, the channel access is determined to be permitted when the comparison result indicates that the persistence value is smaller than the random number. By arranging proper persistence coefficients and the related polynomial, the value ranges of the persistence value and the random number may be the same.

Furthermore, the mobile device may need retransmission when the transmission of the message to the base station in the transmission control procedure 40 is failed. In this situation, the mobile device may perform the transmission control procedure 40 again to control the random back-off time.

The UMTS system has eight ASCs, from high to low priority, represented by ASC#0-ASC#7. That is, ASC#0 corresponds to the highest prioritized service. A Node-B broadcasts a dynamic persistence level N via the SIB type 7 and persistence scaling factors s2-s7 via the SIB type 5. In this situation, please refer to FIG. 5, which illustrates a flowchart of a transmission control procedure 50 based on the concept of FIG. 4. The transmission control procedure 50 is applied for a mobile device that is configured to use ASC#0 for RACH access and stores persistence coefficients A0, A1. The transmission control procedure 50 includes the following steps:

Step 500: Start.

Step 502: Receive the dynamic persistence level N.

Step 504: Draw a random number Ri, where $0 \leq Ri < 1$.

Step 506: Determine a persistence value P0 corresponding to ASC#0 by a polynomial of $[A0+A1*P(N)]$, where $P(N)=2^{-(N-1)}$.

Step 508: Determine if or not the persistence value P0 is smaller than or equal to the random number Ri. If so, perform Step 510, else perform Step 512.

Step 510: Start PRACH transmission.

Step 512: End.

According to the transmission control procedure 50, the mobile device uses the polynomial of $[A0+A1*P(N)]$ whose result is always between 0 to 1 for complying with the value range of the random number Ri. As a result, the persistence value P0 is always between 0 to 1. When the persistence value P0 is smaller than or equal to the random number Ri, this means that the RACH is permitted to be accessed, and thus the mobile device starts the PRACH transmission.

The manufacturer can set different A0 and A1 values for mobile devices. The mobile devices with different A0 and A1 values have different priorities of starting the PRACH transmission even if they are the devices belong to ASC#0. Of course, the manufacturer may set the same A0 and A1 values for all of the mobile devices.

As can be seen from the above, the persistence coefficients of the transmission control procedures 40 and 50 are set beforehand by the manufacturer or the service provider. This has a main advantage that an appropriate persistence value scheme can be made, by an example shown in FIG. 6. As known, too many mobile devices whose channel accesses are permitted in the same short period can cause the channel to be overloaded. Thus, the persistence value scheme can properly distribute different values to stagger access permission timings of the mobile devices which all request for high priority services, e.g. making a emergency call, in the same short period. As a result, the probability of successful channel transmission for a mobile device requesting a high priority service can be increased.

Figure 5:
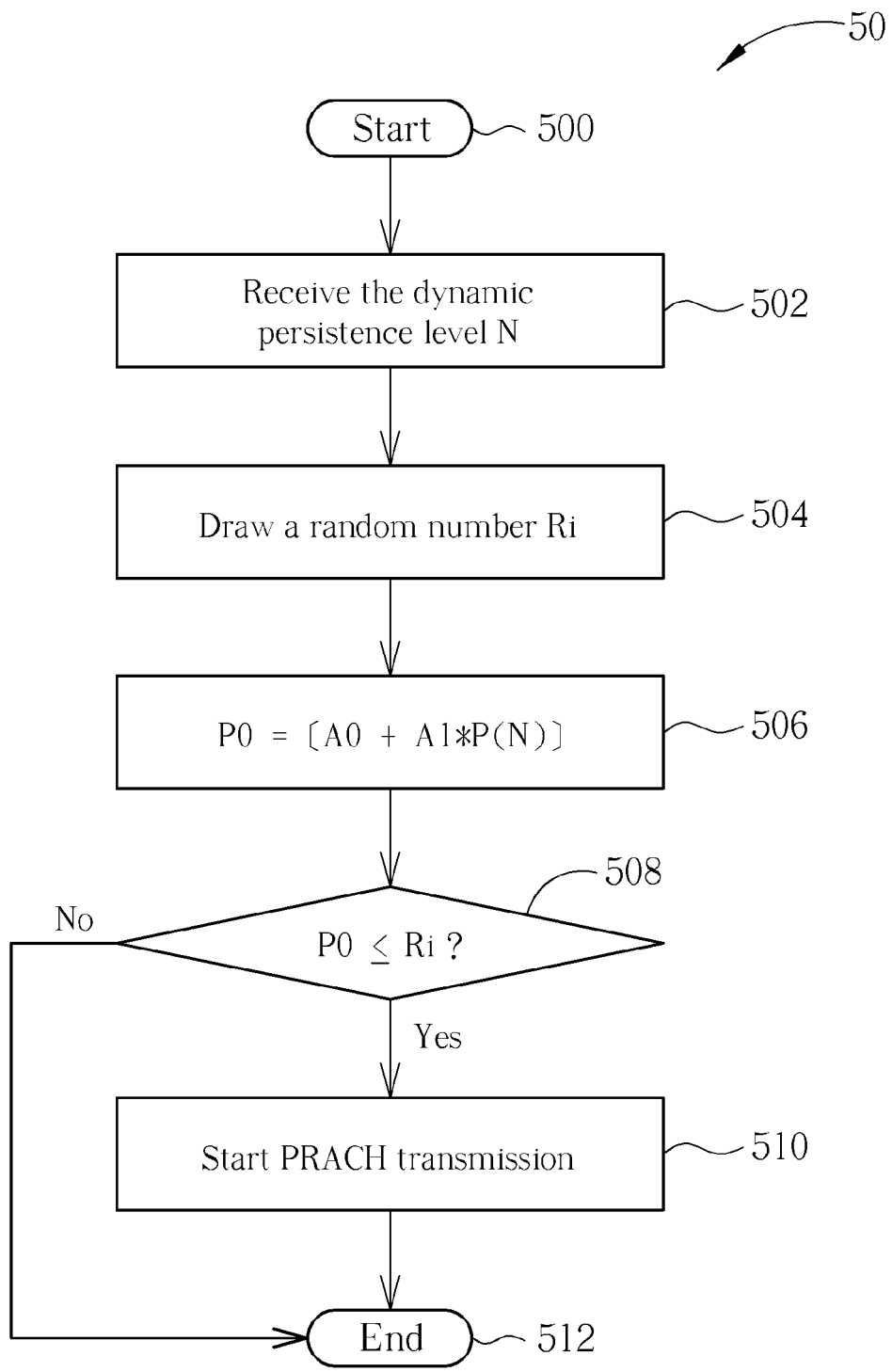
FIG. 5 is a flowchart of a transmission control procedure according to an example of the present disclosure.
Figure 7:
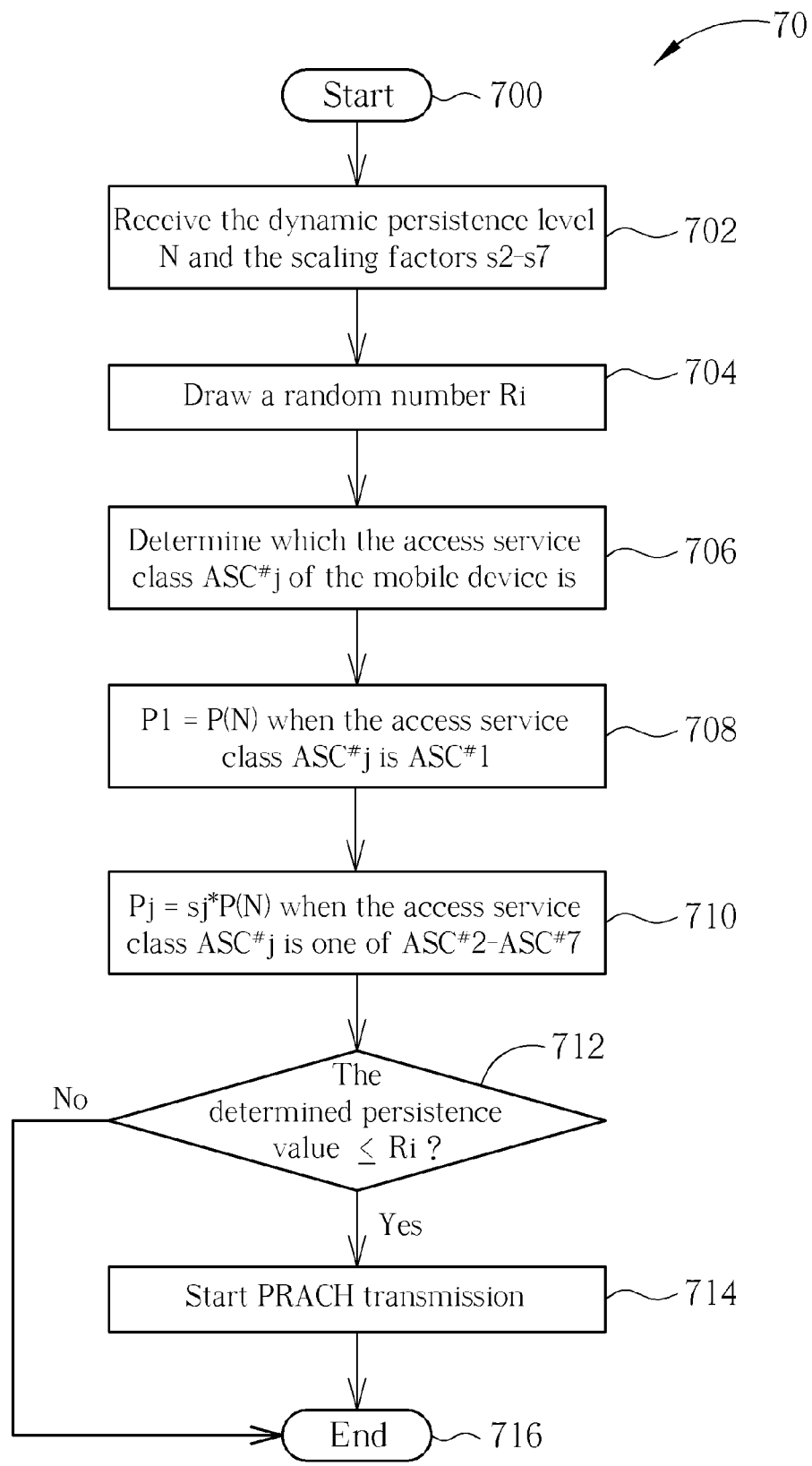
FIG. 7 is a flowchart of a transmission control procedure according to an example of the present disclosure.

In addition to FIG. 5, please refer to FIG. 7, which illustrates a flowchart of a transmission control procedure 70 applied for a mobile device that is configured to use one of ASC#1-ASC#7 for RACH access. The transmission control procedure 70 includes the following steps:

Step 700: Start.

Step 702: Receive the dynamic persistence level N and the scaling factors s2-s7.

Step 704: Draw a random number Ri, where 0≦Ri<1.

Step 706: Determine which a access service class ASC#j of the mobile device is.

Step 708: Determine a persistence value P1 by P(N) when the access service class ASC#j is ASC#1.

Step 710: When the access service class ASC#j is one of ASC#2-ASC#7, determine a persistence value Pj corresponding to ASC#j by sj*P (N).

Step 712: Determine if or not the determined persistence value is smaller than or equal to the random number Ri. If so, perform Step 714, else perform Step 716.

Step 714: Start PRACH transmission.

Step 716: End.

In the transmission control procedure 70, any of the determined P1-P7 is always between 0 to 1 for complying with the value range of the random number Ri. The mobile device determines the persistence value P1 by P(N) when the access service class ASC#j is ASC#1 and determines the persistence value P2 by s2*P (N) when the access service class ASC#j is ASC#2, and so on. Then, the mobile device starts the PRACH transmission for the RACH access when the determined persistence value is smaller than or equal to the random number Ri.

To sum up the transmission control procedures 50 and 70, the relationship between the ASCs and the persistence values is:

ASC#0: P0=A0+A1*P(N), where P(N)=$2^{-(N-1)}$;
ASC#1: P1=P(N);
ASC#2: P2=S2*P(N);
ASC#3: P3=S3*P(N);
ASC#4: P4=S4*P(N);
ASC#5: P5=S5*P(N);
ASC#6: P6=S6*P(N);
ASC#7: P7=S7*P(N).

Please note that a drawing value range of the random number Ri is not limited to between 0 and 1, and can be modified depended on system requirement or operating cost consideration.

Figure 8:
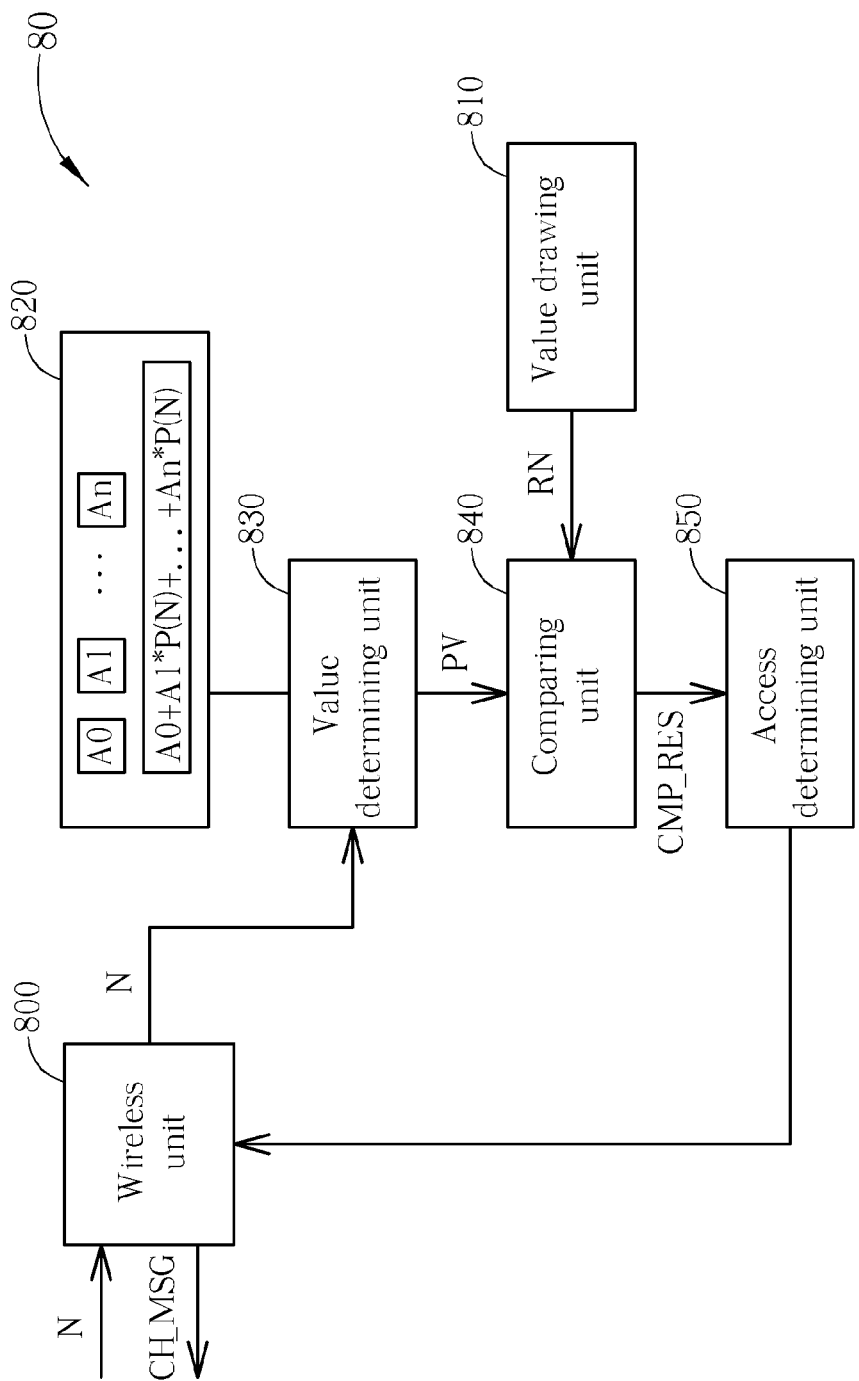
FIG. 8 is a schematic diagram of a mobile device according to an example of the present disclosure.

Please refer to FIG. 8, which illustrates a schematic diagram of a mobile device 80 according to another example of the present disclosure. The mobile device 80 can be used for implementing the transmission control procedures 40-50 and includes a wireless unit 800, a value drawing unit 810, a storage unit 820, a value determining unit 830, a comparing unit 840, and an access determining unit 850. The wireless unit 800 is responsible for transmitting and receiving wireless signals and thereby can receive a dynamic persistence level N from a base station. The storage unit 820 stores persistence coefficients A0-An and a polynomial of [A0+A1*P(N)+ . . . +An*P(N)], where P(N) is $2^{-(N-1)}$. The value determining unit 830 determines a persistence value PV according to the dynamic persistence level N and the persistence coefficient A0-An by the polynomial stored in the storage unit 820. That is, PV=A0+A1*P(N)+ . . . +An*P(N). The value drawing unit 810 can draws a random number RN. The comparing unit 840 compares the persistence value PV with the random number RN to generate a comparison result CMP_RES. The access determining unit 850 determines whether access to a channel is permitted according to the comparison result CMP_RES. The access determining unit 850 can determine that the access to the channel is permitted, when the comparison result CMP_RES indicates that the persistence value PV is not larger than the random number RN. The wireless unit 800 can know that the access to the channel is permitted via the access determining unit 850 and then accesses the channel and transmits a message CH_MSG. Since the mobile device 80 can be used for implementing the transmission control procedures 40-50, detailed operation is omitted herein and can be referred by the abovementioned paragraphs.

On the other hand, the mobile device can have more than one persistence value parameter for a specific ASC (e.g. persistence value for ASC#0). For example, the mobile device is setup with variable and constant modes and has persistence value parameters P0C and P0V. In the variable mode, the value of the persistence value parameters P0V is determined according to the transmission control procedure 40 and any transmission control procedure using the same concept. In the constant mode, the mobile device determines a constant value as the persistence value P0C with which corresponding access determining result always shows that access to a channel is permitted. The access determining result may be a comparison result generated by comparing the persistence value P0C with a random number that may be dedicated to the constant mode or shared with the variable mode (e.g. the random number Ri as mentioned above). For example, the persistence value parameter P0C can be set to 1, always larger than the random number Ri, so that the mobile device ensures that RACH is permitted to be accessed. In other words, the PRACH transmission is always able to be started under the constant mode.

After the constant mode, irrespective of being default mode or not, is performed, the mobile device switches to use the variable mode when transmission caused by the constant mode meets at least one of the following situations:

(A1) when acknowledgement for a transmission associated with the permitted channel is not received;

(A2) when the transmission is used for an emergency call service and the emergency has failed to be made for a predetermined period;

(A3) when the transmission is used for an emergency call service and a predetermined number of emergency calls made by the mobile device have failed; and (A4) when the comparison result of constant mode indicates that the channel is permitted to be accessed and a transmission associated with the persistence value parameter P0C is not acknowledged by the base station.

In addition, the mobile device may also determine a constant value as the persistence value P0C when the comparison result of the variable mode indicates that the channel is not permitted to be accessed. Then the mobile device determines whether the channel is permitted to be accessed according to a comparison result of the constant mode generated by comparing the persistence value parameter P0C with the random number that is dedicated to the constant mode or shared with the variable mode. Similarly, the mobile device may switch from the variable mode to constant mode when transmission caused by the variable mode meets at least one of the (A1), (A2), (A3) and (B4) when the comparison result of the variable mode indicates that the channel is permitted to be accessed and a transmission associated with the persistence value parameter P0V is not acknowledged by the base station.

The constant/variable mode scheme can be employed in consideration of fast transmission and higher probability of successful channel transmission. When the number of mobile devices does not cause heavy load to cell or coverage, the constant mode associated with the persistence value parameter P0C is preferred for fast transmission in that the channel accesses of all the mobile devices are definitely permitted after the transmission control procedure is performed. In addition, the constant mode implies that the mobile devices have the same priorities of starting their transmissions even if belonging to the same ASC. When the number of mobile devices causes heavy load to the cell, the variable mode associated with the persistence value parameter P0V is preferred for higher probability of successful channel transmission in that not all the mobile devices permit the channel accesses in the same short period. Thereby, the channel does not run into overload, or for an overloaded channel, the overload does not become severer.

Please note that either the constant mode or the variable mode can be a default mode. Furthermore, the constant and variable modes can be re-used alternately for predetermined times when either of the modes is failed.

In addition to the constant/variable mode scheme, multiple sets of persistence coefficients for the variable mode can be stored in a mobile device supporting multiple RATs (Radio Access Technologies), such as GSM, UMTS, LTE (Long term Evolution), WiMax and WiFi. Each set may correspond to a RAT. An example of sets of persistence coefficients for the persistence value parameter P0Vs of multiple RATs is shown in FIG. 9. If the constant/variable mode schemes used in one of the RATs are both failed in permission of channel access or are both performed followed by transmission failure (e.g. transmission failure of an emergency call service), the mobile device can switch or hand over to another RAT and uses corresponding persistence coefficient set with the variable mode.

For example, a mobile device of the UMTS system uses the constant mode and thereby applies the persistence value parameter P0C=1 for ASC#0. The mobile device may determine if it has failed to make an emergency call for a predetermined period or after a predetermined number of attempts. If yes, the mobile device may switch to the variable mode and thereby determines the persistence value parameter P0V for ASC#0 based on the transmission control procedure 40. After this, the mobile device may determine if it still has failed to make an emergency call for the predetermined period or after the predetermined number of attempts. If also yes, the mobile device may attempt to send an emergency message using at least one of the following RAT network: GSM, LTE, WiMax and WiFi. The mobile device may select the most appropriate RAT network from GSM, LTE, WiMax and WiFi to send the emergency message via the variable mode according to the corresponding persistence coefficient stored in the mobile device. Taking FIG. 9 as example, the mobile device sends the emergency message via the variable mode according to A0=0.99 and A1=0.01 if the GSM is selected. The channels accessed under different RATs may be different.

Figure 10:
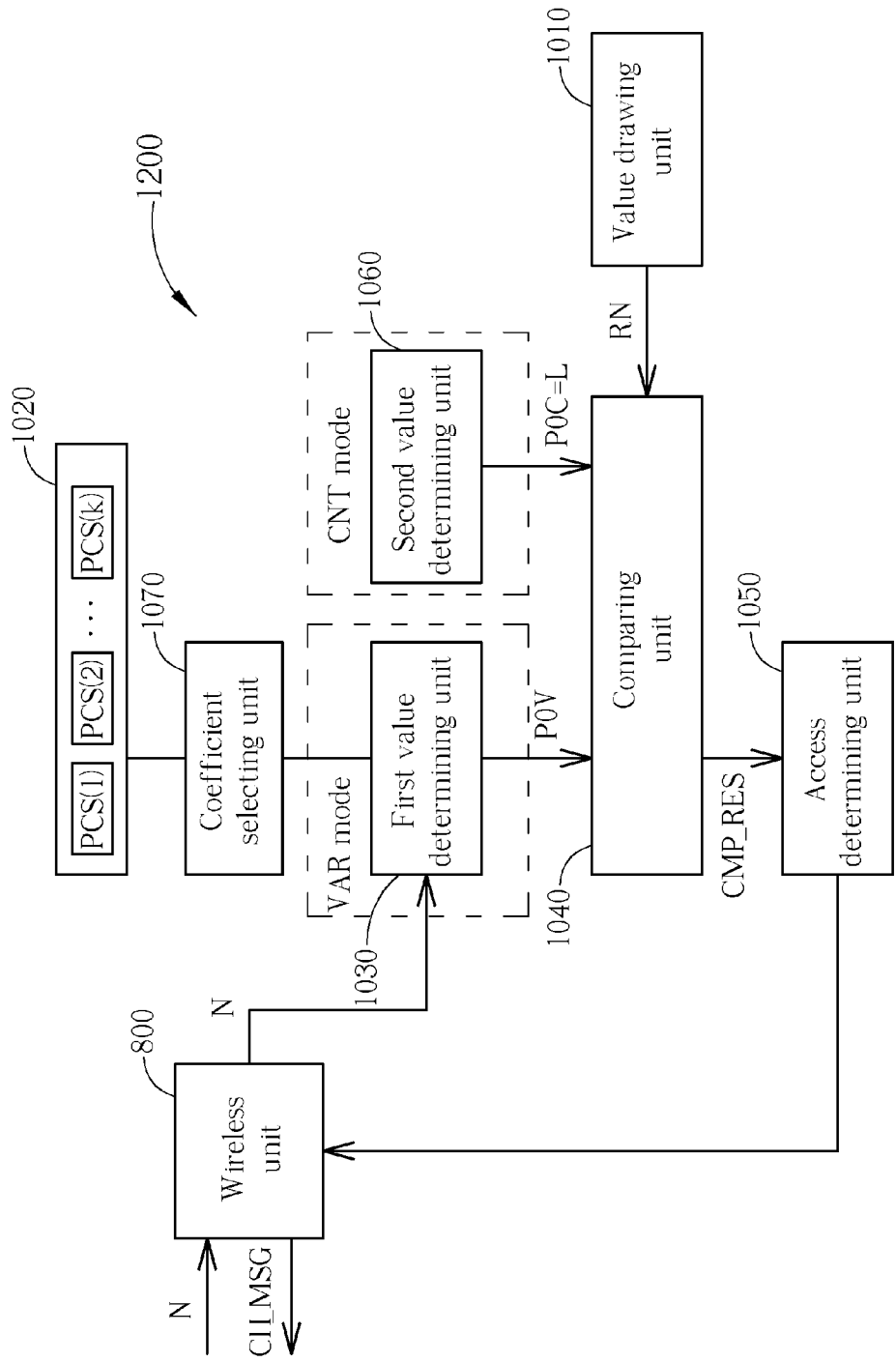
FIG. 10 is a schematic diagram of a mobile device according to an example of the present disclosure.

Please refer to FIG. 10, which illustrates a schematic diagram of a mobile device 1200 according to another example of the present disclosure. The mobile device 1200 can be used for implementing functions of the transmission control procedures 40-50, the constant/variable mode scheme and persistence coefficient scheme for support of multiple RATs. In this situation, the mobile device 1200 includes a wireless unit 1000, a value drawing unit 1010, a storage unit 1020, a first value determining unit 1030, a comparing unit 1040, an access determining unit 1050, a second value determining unit 1060 and a coefficient selecting unit 1070. Since the mobile device 1200 can also implement the transmission control procedures 40-50, the wireless unit 1000, the value drawing unit 1010, the first value determining unit 1030, the comparing unit 1040, the access determining unit 1050 are capable of the abovementioned functions of the wireless unit 800, the value drawing unit 810, the storage unit 820, the value determining unit 830, the comparing unit 840, and the access determining unit 850, respectively. Thus, similar operation description is omitted herein.

In the mobile device 1200, the storage unit 1020 includes persistence coefficient sets PCS(1)-PCS(k) corresponding to RAT(1)-RAT(k) respectively. When the mobile device 1200 operates in a specific RAT, taking RAT(k) for example herein, constant (CNT) and variable (VAR) modes making use of the first value determining unit 1030 and the second value determining unit 1060 respectively are provided. In VAR mode, the mobile device 1200 utilizes the first value determining unit 1030 to determine the value of the persistence value parameter P0V according to the dynamic persistence level N and the persistence coefficient set PCS(k). In CNT mode, the mobile device 1200 deactivates the first value determining unit 1030, and the second value determining unit 1060 sets the persistence value parameter P0C to a constant value L. The second value determining unit 1060 can work before the CNT mode or after the mobile device 1200 determines that the channel is not permitted to be accessed in the CNT mode. In CNT mode, the access determining unit 1050 can determine that the channel is permitted to be accessed, according to the comparison result CMP_RES of the persistence value PV set to the constant value L and the random number RN. Furthermore, the VAR mode can be performed when a transmission caused by the CNT mode (e.g. transmission of a CH_MSG message) is not acknowledged, when the transmission caused by the CNT mode is used for an emergency call service and the emergency call has failed to be made for a predetermined period, or when the transmission caused by the CNT mode is used for an emergency call service and a predetermined number of made emergency calls have failed.

The VAR and CNT modes of the RAT(k) may be both failed or meet any of the abovementioned situations (A1)-(A3). In this situation, the mobile device 1200 can handover to another RAT, taking RAT(1) for example herein. Accordingly, the coefficient selecting unit 1070 selects the persistence coefficient set PCS(1) for use of the VAR mode in the RAT(1).

In conclusion, the abovemention examples provides a channel access method based on the coefficients stored in the mobile device to allow the manufacturer or the service provider to realize an preferred channel access strategy beforehand to improve a transmission success rate (for avoiding channel overload), a two mode method to look after both sides of fast transmission and the higher transmission success rate, and a persistence coefficient scheme for support of multiple RATs.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of controlling channel access for a mobile device in a wireless communication system, the method comprising:

receiving a dynamic persistence level from the wireless communication system;

determining a first persistence value according to the dynamic persistence level and at least one persistence coefficient stored in the mobile device;

comparing the first persistence value with a first random number;

according to a first comparison result generated by the step of comparing the first persistence value with the first random number, determining whether a first channel is permitted to be accessed for sending a message from the mobile device to the wireless communication system;

determining a constant value as a second persistence value when the first comparison result indicates that the first channel is not permitted to be accessed; and determining whether the first channel is permitted to be accessed according to a second comparison result generated by comparing the second persistence value with the first random number or with a second random number, wherein the constant value is larger than the first random number and the second random number, and wherein the first persistence value and the second persistence value correspond to the same access service class (ASC).

2. The method of claim 1, wherein the step of according to the first comparison result generated by the step of comparing the first persistence value with the first random number, determining whether the first channel is permitted to be accessed for sending the message from the mobile device to the wireless communication system comprises:

determining that the first channel is permitted to be accessed when the first comparison result indicates that the persistence value is smaller than or equal to the first random number.

3. A method of controlling channel access for a mobile device in a wireless communication system, the method comprising:

receiving a dynamic persistence level from the wireless communication system;

determining a first persistence value according to the dynamic persistence level and at least one persistence coefficient stored in the mobile device;

comparing the first persistence value with a first random number; and according to a first comparison result generated by the step of comparing the first persistence value with the first random number, determining whether a first channel is permitted to be accessed for sending a message from the mobile device to the wireless communication system;

determining a constant value as a second persistence value before the step of determining the first persistence value according to the dynamic persistence level and the persistence coefficients is performed;

determining whether the first channel is permitted to be accessed according to a second comparison result generated by comparing the second persistence value with the first random number or with a second random number, wherein the constant value is larger than the first random number and the second random number, and wherein the first persistence value and the second persistence value correspond to the same access service class (ASC); and performing the step of determining the first persistence value according to the dynamic persistence level and the persistence coefficients stored in the mobile device when the second comparison result indicates that the first channel is not permitted to be accessed.

4. The method of claim 3, further comprising:

performing the step of determining the first persistence value according to the dynamic persistence level and the at least one persistence coefficient stored in the mobile device when the second comparison result indicates that the first channel is permitted to be accessed and a transmission associated with the second persistence value is not acknowledged by the wireless communication system.

5. The method of claim 3, further comprising:

performing the step of determining the first persistence value according to the dynamic persistence level and the at least one persistence coefficient stored in the mobile device when an emergency call made by the mobile device has failed for a predetermined period.

6. The method of claim 3, further comprising:

performing the step of determining the first persistence value according to the dynamic persistence level and the persistence coefficients stored in the mobile device when a predetermined number of emergency calls made by the mobile device have failed.

7. A method of controlling channel access for a mobile device in a wireless communication system, the method comprising:

receiving a dynamic persistence level from a first wireless communication system;

determining a first persistence value according to the dynamic persistence level and a first persistence coefficient stored in the mobile device, wherein the first persistence coefficient corresponds to the first wireless communication system;

comparing the first persistence value with a first random number; and according to a first comparison result generated by the step of comparing the first persistence value with the first random number, determining whether a first channel is permitted to be accessed for sending a message from the mobile device to the first wireless communication system;

selecting a second persistence coefficient stored in the mobile device when a transmission associated with the first persistence coefficient is not acknowledged by the first wireless communication system, when an emergency call made by the mobile device has failed for a predetermined period, or when a predetermined number of emergency calls made by the mobile device have failed, wherein the second persistence coefficient corresponds to a second wireless communication system;

determining a second persistence value according to the second persistence coefficient;

comparing the second persistence value with a second random number; and according to a second comparison result generated by comparing the second persistence value with the second random number, determining whether a second channel is permitted to be accessed for sending a message from the mobile device to the second wireless communication system, wherein the first communication system and the second communication system are different from each other, and each of the first communication system and the second communication system is one of GSM, UMTS, LTE (Long term Evolution), WiMax and WiFi.

8. The method of claim 7, further comprising:

setting up a plurality of access service classes (ASCs) with each having a corresponding priority, wherein the first persistence value corresponds to one of the ASCs with the highest priority.

9. A mobile device of a first wireless communication system for controlling channel access, the mobile device comprising:

a wireless unit for receiving a dynamic persistence level from the first wireless communication system;

a storage unit for storing at least one persistence coefficient;

a first value determining unit for determining a first persistence value according to the dynamic persistence level and the at least one persistence coefficient;

a comparing unit for generating a first comparison result by comparing the first persistence value with a first random number;

a second value determining unit for determining a constant value as a second persistence value when the first comparison result indicates that the first channel is not permitted to be accessed; and an access determining unit for, according to the first comparison result, determining whether a first channel is permitted to be accessed for sending a message from the mobile device to the first wireless communication system, wherein the access determining unit further determines whether the first channel is permitted to be accessed according to a second comparison result generated by comparing the second persistence value with the first random number or with a second random number;

wherein the constant value is larger than the first random number and the second random number, and wherein the first persistence value and the second persistence value correspond to the same access service class (ASC).

10. The mobile device of claim 9, wherein the access determining unit determines that the first channel is permitted to be accessed when the first comparison result indicates that the persistence value is smaller than or equal to the first random number.

11. A mobile device of a first wireless communication system for controlling channel access, the mobile device comprising:
    a wireless unit for receiving a dynamic persistence level from the first wireless communication system;
    a storage unit for storing at least one persistence coefficient;
    a first value determining unit for determining a first persistence value according to the dynamic persistence level and the at least one persistence coefficient;
    a comparing unit for generating a first comparison result by comparing the first persistence value with a first random number;
    an access determining unit for, according to a first comparison result, determining whether a first channel is permitted to be accessed for sending a message from the mobile device to the first wireless communication system; and
    a second value determining unit for determining a constant value as a second persistence value before the first value determining unit determines the first persistence value according to the dynamic persistence level and the persistence coefficients;
    wherein the constant value is larger than the first random number and the second random number, and wherein the first persistence value and the second persistence value correspond to the same access service class (ASC).

12. The mobile device of claim 11, wherein the access determining unit determines whether the first channel is permitted to be accessed according to a second comparison result generated by comparing the second persistence value with the first random number or with a second random number; and the first value determining unit determines the first persistence value according to the dynamic persistence level and the persistence coefficients stored in the mobile device when the second comparison result indicates that the first channel is not permitted to be accessed.

13. The mobile device of claim 12, wherein the first value determining unit further determines the first persistence value according to the dynamic persistence level and the at least one persistence coefficient stored in the mobile device when the second comparison result indicates that the first channel is permitted to be accessed and a transmission associated with the second persistence value is not acknowledged by the first wireless communication system.

14. The mobile device of claim 11, wherein the first value determining unit determines the first persistence value according to the dynamic persistence level and the at least one persistence coefficients stored in the mobile device when an emergency call made by the mobile device has failed for a predetermined period.

15. The mobile device of claim 11, wherein the first value determining unit determines the first persistence value according to the dynamic persistence level and the at least one persistence coefficient stored in the mobile device when a predetermined number of emergency calls made by the mobile device have failed.

16. A mobile device of a wireless communication system for controlling channel access, the mobile device comprising:
    a wireless unit for receiving a dynamic persistence level from a first wireless communication system;
    a storage unit for storing a first persistence coefficient and a second persistence coefficient;
    a first value determining unit for determining a first persistence value according to the dynamic persistence level and the first persistence coefficient, wherein the first persistence coefficient corresponds to the first wireless communication system;
    a comparing unit for generating a first comparison result by comparing the first persistence value with a first random number; and
    an access determining unit for, according to the first comparison result, determining whether a first channel is permitted to be accessed for sending a message from the mobile device to the first wireless communication system,
    a coefficient selecting unit for selecting the second persistence coefficient when a transmission associated with the first persistence coefficient is not acknowledged by the first wireless communication system, when an emergency call made by the mobile device has failed for a predetermined period, or when a predetermined number of emergency calls made by the mobile device have failed, wherein the second persistence coefficient corresponds to a second wireless communication system; and
    a second value determining unit for determining a second persistence value according to the second persistence coefficient, wherein the comparing unit is further used for comparing the second persistence value with a second random number; and the access determining unit further determines whether a second channel is permitted to be accessed for sending a message from the mobile device to the second wireless communication system, according to a second comparison result generated by comparing the second persistence value with the second random number,
    wherein the first communication system and the second communication system are different from each other, and each of the first communication system and the second communication system is one of GSM, UMTS, LTE (Long term Evolution), WiMax and WiFi.

* * * * *